United States Patent [19]

Dziewulski et al.

[11] 4,224,764
[45] Sep. 30, 1980

[54] CONTAINER HAVING ATTACHED TRAY

[75] Inventors: Ted Dziewulski, Rosemont; Arthur H. Kay, Schaumburg, both of Ill.

[73] Assignee: Phillips Petroleum Company, Bartlesville, Okla.

[21] Appl. No.: 12,096

[22] Filed: Feb. 14, 1979

[51] Int. Cl.³ .................................................. A01G 9/02
[52] U.S. Cl. ............................................... 47/71; 47/67; 220/85 H; 215/100.5; 248/346.1; D7/45
[58] Field of Search ................................ 47/66–67, 47/71, 79–81; 248/346, 346.1; 215/100.5; 220/85 R, 85 H; D7/45

[56] References Cited

U.S. PATENT DOCUMENTS

| D. 153,715 | 8/1974 | Landers | 47/66 |
|---|---|---|---|
| D. 228,721 | 10/1973 | Todd | 215/100.5 X |
| 1,391,353 | 9/1921 | Wells | 47/71 |
| 3,079,037 | 2/1963 | Schechter | 220/60 |
| 3,107,028 | 10/1963 | De Robertis | 220/60 |
| 3,455,055 | 7/1969 | Chute | 47/81 |
| 3,704,545 | 12/1972 | Van Reissen | 47/84 |
| 3,949,524 | 4/1976 | Mickelson | 47/71 |
| 3,965,616 | 6/1976 | Ridgeway | 47/71 |
| 4,040,549 | 8/1977 | Sadler | 220/85 H X |
| 4,047,329 | 9/1977 | Holt | 47/66 |
| 4,062,147 | 12/1977 | Phillips | 47/71 |

FOREIGN PATENT DOCUMENTS 289885 10/1965 Australia .................................. 47/81

Primary Examiner—Robert E. Bagwill

[57] ABSTRACT

A securable container and tray combination comprising an open top container; a tray; a first set of a plurality of camming means on a lower portion of the container; and a second set of a plurality of camming means attached to the tray; wherein said first and second sets of camming means are adapted such that when the container and the tray are placed in contact and twisted the camming means of the container and the camming means of the tray will slide one upon the other to cause a wedging action that secures the container and the tray.

17 Claims, 13 Drawing Figures

CONTAINER HAVING ATTACHED TRAY

This invention relates to containers. In another aspect this invention relates to containers having trays associated therewith, such as, for example, horticultural containers having drainage trays associated therewith.

There are many situations in which it has been found desirable to have a container having a removeable tray associated therewith. A most noteable example is in horticultural containers.

When these horticultural containers are used indoors for houseplants, they are normally used with saucers or trays whereby the perforated bottom of the pot is directly supported on the non-porous flat base plate of the saucer or tray, or alternatively on some other non-porous support. In the past some pots have been produced with integral, i.e. non-removeable trays. The non-removeable trays have generally been found to be hard to clean. Accordingly, horticultural containers having removeable trays are generally preferred by the consumer.

In the past numerous techniques have been developed for securing removeable trays to containers such as horticultural containers. One technique has involved the employment of upstanding means on the tray which provide a telescopic tight-fit with a lower portion of the container. Examples of such a technique are shown in U.S. Pat. Nos. 4,047,329 and 4,062,147. Since such a technique depends primarily upon friction to keep the container and tray secured, the attachment is sometimes not as secure as might be desired. Another technique employed to secure the container and the tray has involved employing a keyhole and locking lug type arrangement such as shown in U.S. Pat. Nos. 153,715 and 1,391,353. The lug and keyhole technique provides a very secure connection; however, for forming molded containers it is desirable generally to employ means having less complicated molding requirements. Still another technique has involved the employment of holes and locking lugs such as illustrated in U.S. Pat. Nos. 3,965,616 and 3,949,524. Also snap fit means such as illustrated in U.S. Pat. Nos. 3,107,028 and 3,079,037 have been employed. These last two techniques while providing very secure connection between the container and tray are subject to the disadvantage that the separation and joining require the employment of significant amounts of force and that the securing means are quite susceptible to breakage in use. One further technique has involved the use of spaced apart protrusions on portions of the container which are adapted to pass beside and below spaced apart protrusions on the tray and which upon twisting of either the tray or the container fit under the protrusion of the tray. See, for example, items 19 and 20 in FIGS. 8 and 9 of U.S. Pat. No. 3,704,545. The disadvantage of that technique is that it takes very little force to rotate the container relative to the tray. Thus the tray and the container are extremely susceptible to being accidentally separated.

An object of the present invention is to provide means for securing a container to a tray which will result in a more secure fit than obtained with prior friction fit techniques.

Another object of the present invention is to provide a container and tray combination having securing means that require less material and less complicated molds than required for the securing means of many prior art container tray assemblies.

Another object of the present invention is to provide a container and tray combination which can be firmly secured with relatively little physical effort and with relatively little mental concentration.

Yet another object of the present invention is to provide a container and tray combination in which the securing means are less susceptible to breakage in use than certain prior art sealing means for containers and trays.

Other objects, aspects, and advantages of the instant invention will become apparent from the following description and the accompanying drawings.

In accordance with the present invention there is provided a container and tray which can be secured one with the other comprising an open top container having a bottom, a tray having a bottom, a first set of a plurality of camming means on a lower portion of the container, and a second set of a plurality of camming means attached to said tray, wherein said first and second sets of camming means are adapted so as to permit said container and said tray to be placed in contact and twisted such that the camming means of the container and the camming means of the tray slide one upon the other to cause a wedging action that secures the container and the tray. The term "wedging action" as used herein is intended to indicate that the camming means exert force against each other, in such a fashion that the outer camming means exerts inward force on the inner camming means and the inner camming means exerts outward force on the outer camming means.

The number of camming means employed is not considered critical; however, it is preferred for the tray and the container to each have at least three or more camming means.

The relative thickness and length of the various camming means is not considered critical so long as the one set of camming means can be telescoped within the other set of camming means in at least one position of the container relative to the tray without any substantial wedging action between the sets of camming means.

At least one end of each camming means of said first set of camming means and at least one end of each camming means of said second set of camming means are sloped so that said first and second camming means can be slid one upon the other with relative little force. In one preferred embodiment the camming means are sloped on each end so that the wedging action can be achieved by either a counter-clockwise or a clockwise twisting of the container relative to the tray.

A further understanding of the present invention, its objects and advantages will follow from the following more detailed description of the invention in regard to embodiments illustrated in the appended drawings wherein.

Figure 1:
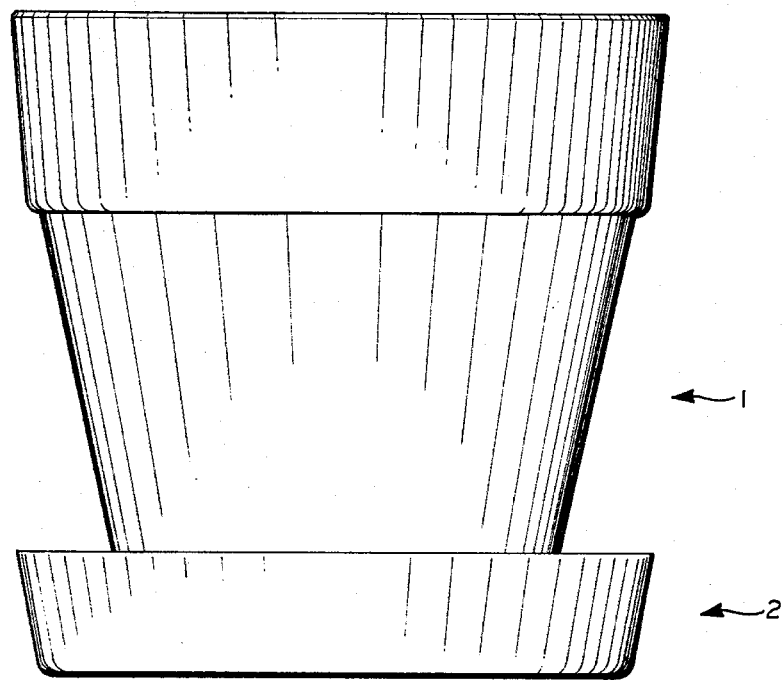
FIG. 1 is a elevational view illustrating a container and a tray secured together in accordance with one embodiment of the present invention.

Now referring to the drawings in more detail, FIG. 1 illustrates a container 1 and tray 2 combination to which the present invention is applicable.

Figure 2:
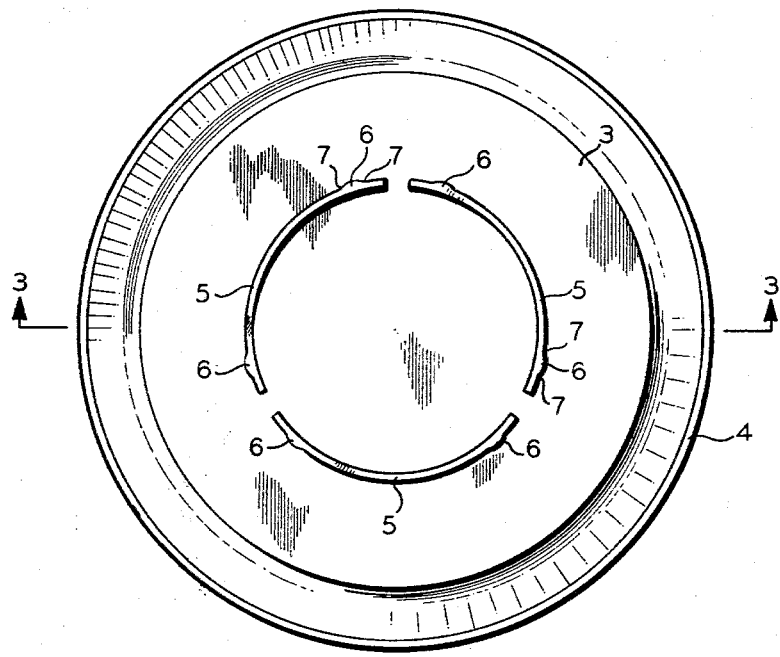
FIG. 2 is a top plan view of the tray illustrated in FIG. 1.
Figure 3:
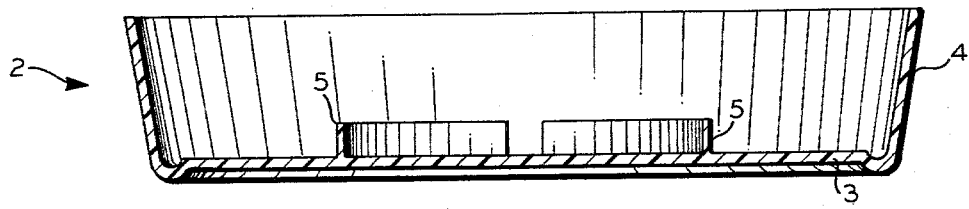
FIG. 3 is a cross-sectional view of the tray illustrated in FIG. 2 as taken through line 3—3.

The tray 2 as shown in more detail in FIGS. 2 and 3 comprises a bottom 3 and an upstanding wall 4 having a generally frustoconical configuration. Extending upwardly from the upper surface of the bottom 3 of the tray 2 are three spaced apart arcuate walls 5 lying in a circular locus. On the outer surface of each arcuate wall 5 there are located two spaced part camming means 6. The camming means have sloped portions 7 at each end thereof.

Figure 4:
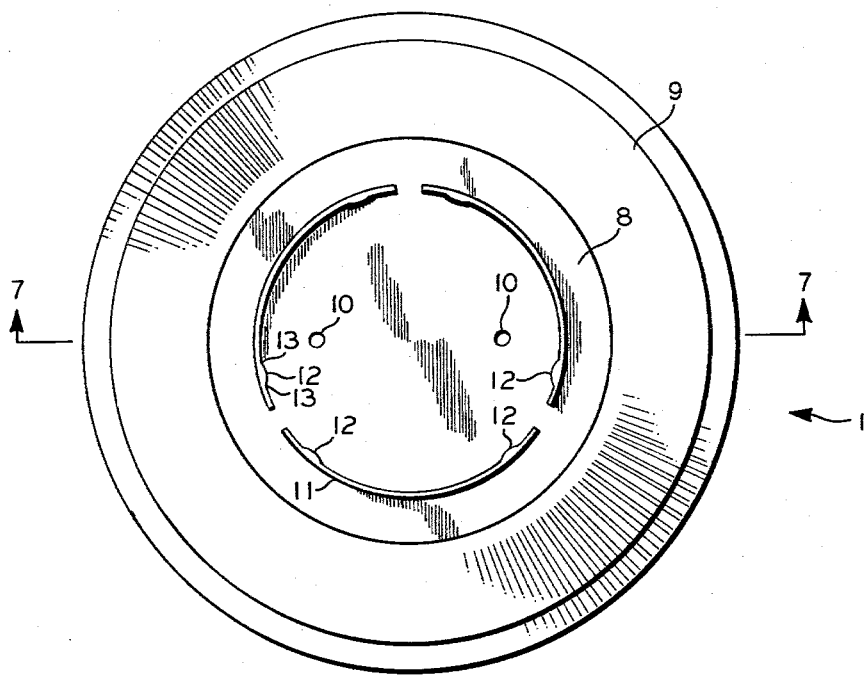
FIG. 4 is a bottom plan view of the container illustrated in FIG. 1.
Figure 7:
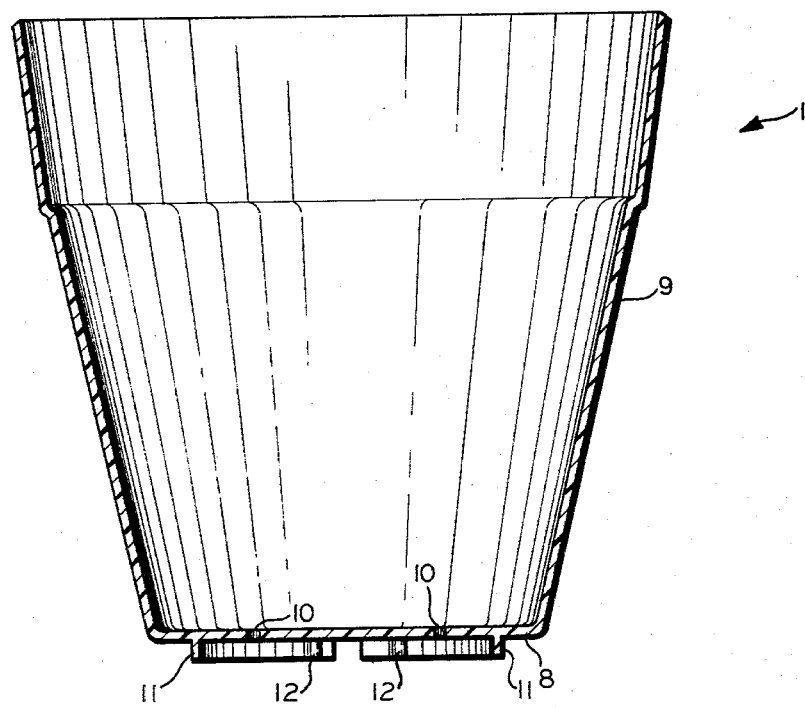
FIG. 7 is a cross-sectional view of the container illustrated in FIG. 4 as taken through line 7—7.

The container 1 as shown in more detail in FIGS. 4 and 7 comprises a bottom 8 and an upstanding wall 9 having a generally frustoconical configuration. The bottom 8 contains perforations 10 therethrough. The perforations 10 serve as drainage holes such as those generally found in horticultural containers. The bottom 8 further includes three arcuate walls 11 lying in a circular locus and extending downward from the lower surface of the container bottom 8. On the inner surface of each arcuate wall 11 there are located two spaced apart camming means 12. The camming means 12 also include sloped portions 13 at each end.

The arcuate walls 11 and camming means 12 of the container and the arcuate walls 5 and camming means 6 of the tray are so dimensioned that the camming means 6 of the tray can be telescoped within the camming means 12 of the container without causing any substantial wedging action on each other or on the respective arcuate walls 5 and 11. The camming means 6 and 12 are positioned on their respective arcuate walls 5 and 11 in such a manner that the container 1 and the tray 2 can be positioned such that each camming means 6 will rest upon a camming means 12.

Figure 5:
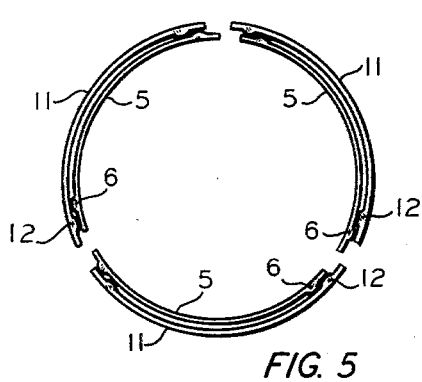
FIG. 5 is a diagrammatical representation illustrating how the camming means on the container of FIG. 7 and the tray of FIG. 3 are associated prior to the securing of the tray and the container.
Figure 6:
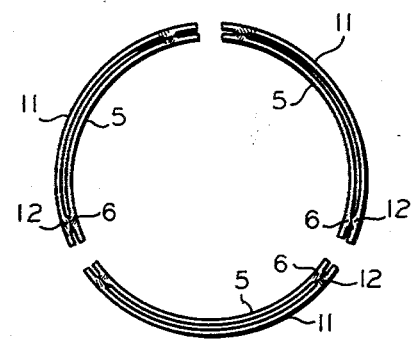
FIG. 6 is a diagrammatical representation illustrating how the camming means on the container of FIG. 7 and the tray of FIG. 3 are associated when the tray and the container are secured together.

The function of the camming means 6 and 12 is more clearly illustrated in FIGS. 5 and 6. FIG. 5 illustrated the relationship between a camming means 6 of the tray 2 and a camming means 12 of the container 1 in the telescoped relationship prior to bringing about the wedging action. As shown the camming means 6 fits within the arcuate wall 11 such that no force is exerted on the wall 11 by the means 6. Likewise the arcuate wall 5 fits within the camming means 12 such that no force is exerted upon the wall 5 by the means 12. Upon twisting of the container 1 relative to the tray 2 a more secure relationship is brought about. The sloped portions 7 and 13 of the camming means allow the camming means 6 and 12 to be readily slid upon one another so as to exert force against each other and thus indirectly upon each other's arcuate wall. This wedging action of the cams is illustrated in FIG. 6.

It is further pointed out that arcuate walls 5 are taller than arcuate walls 11. Having arcuate walls 5 taller than arcuate walls 11 insures that the spaces between the arcuate walls provide openings beneath the arcuate walls 11 which provide passageways permitting fluid flow in an out of the zone enclosed by the telescoped arcuated walls 5 and 11. Such fluid flow is important when it is desired to assure that the container have free drainage. It is also important in those situations where the growth media in the container is watered by drawing water from the try through wicks which extend from the growth media down into the tray.

It will be noted that in the embodiment illustrated in FIGS. 1–7 the arcuate walls 5 and 11 are tapered slightly on the inside and outside. That feature is not considered essential to the operaion of the invention. However, when the container and tray are formed by injection molding such tapered walls are generally necessary to allow the finished parts to be readily removed from the molds.

Figure 8:
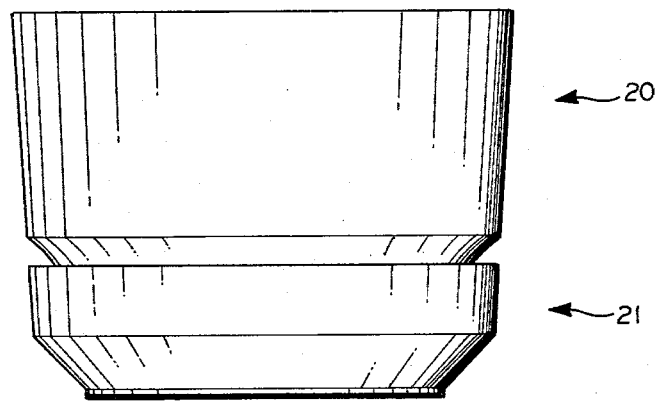
FIG. 8 is a side view illustrating a container and a tray secured together in accordance with another embodiment of the present invention.

FIG. 8 illustrates another container 20 and tray 21 combination to which the present invention is applicable. It should be clear that the container and tray illustrated in FIG. 8 could be secured using the same type of securing means as was illustrated in FIGS. 2–7; however, FIGS. 9–13 illustrate another more preferred structure.

Figure 9:
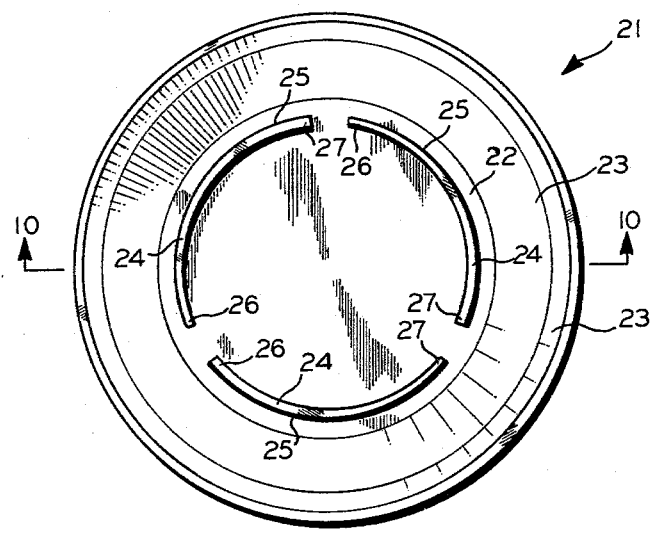
FIG. 9 is a top plan view of the tray illustrated in FIG. 8.
Figure 10:
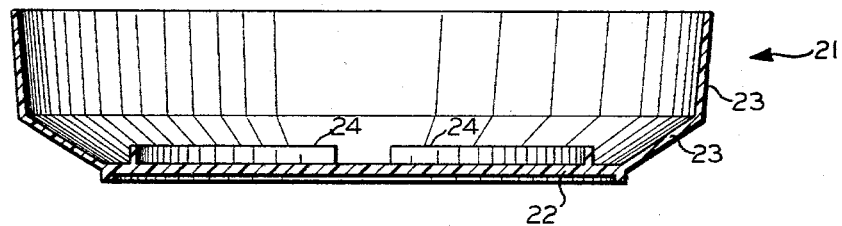
FIG. 10 is a cross-sectional view of the tray illustrated in FIG. 9 as taken through line 10—10.

The tray as shown in more detail in FIGS. 9 and 10 comprises a bottom 22 and an upstanding wall 23 hving a generally frustoconical configuration. Extending upwardly from the upper surface of the bottom 22 of the tray 21 are three spaced apart arcuate walls 24 lying in a circular locus. The outer surface of each arcuate wall includes a camming means 25 which extend substantially the total length of the arcuate wall with which it is associated. The camming means are defined by a thin end portion 26 at one end of said arcuate wall. The camming means arcs outwardly from the thin end portion to a thick end portion 27 at the opposite end of said arcuate wall.

Figure 11:
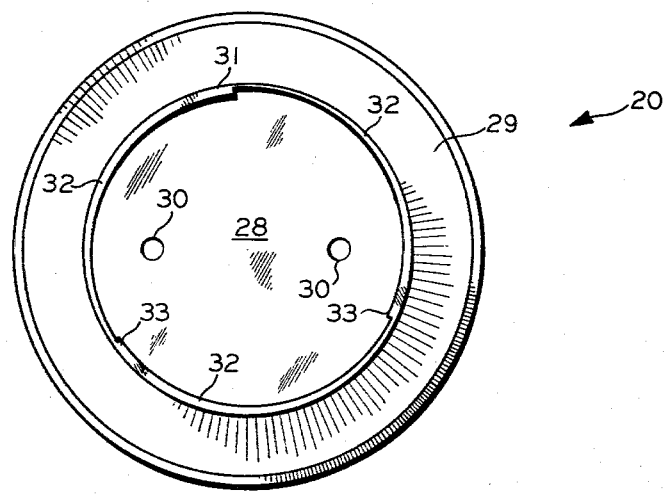
FIG. 11 is a bottom plan view of the container illustrated in FIG. 8.
Figure 13:
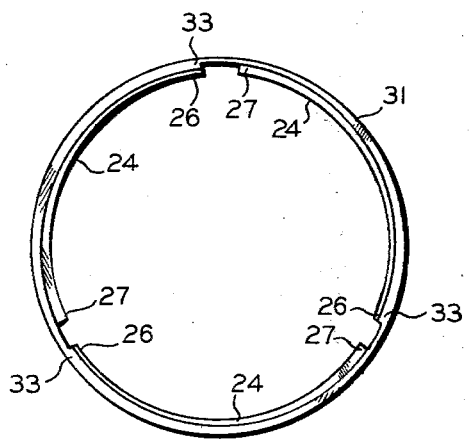
FIG. 13 is a diagrammatical representation illustrating how the camming means on the container of FIG. 11 and the tray of FIG. 9 are associated when the tray and the container are secured together. Again the perspective is one looking up through the tray to the bottom of the container.

The container 20 as shown in FIG. 11 includes a bottom 28 and an upstanding wall 29. The bottom 28 contains perforations 30 therethrough for drainage as described in regard to the first discussed container-tray combination. The container 20 further includes a base portion 31 lying in a circular locus extending downward from the lower surface of the container bottom 28. Spread around the inner surface of the base portion 31 are three camming means 32. Each camming means 32 terminates in an end portion 33 that is thicker than the remaining portions of said camming means.

Figure 12:
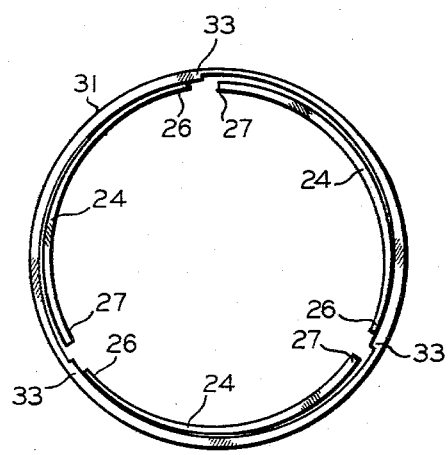
FIG. 12 is a diagrammatical representation illustrating how the camming means on the container of FIG. 11 and the tray of FIG. 9 are associated prior to the securing of the tray and the container. The perspective is one looking up through the tray to the bottom of the container.

The arcuate walls 24 and camming means 25 of the tray and the base 31 and camming means 32 of the container are so dimensioned that the camming means of the tray can be telescoped within the camming means of the container without causing any substantial wedging action on each other or on the base portion 31 and arcuate walls 24. That relationship is illustrated in FIG. 12. After the container 20 and the tray 21 have been placed in such relationship a twisting of the container clockwise relative to the tray will result in the camming means 25 sliding upon respective camming means 32 so as to provide the wedging action which secures the container and the tray.

It will be noted that in the embodiment illustrated in FIGS. 9–13 the arcuate walls 24 are taller than the base porton 31. Here again this provides for fluid flow as was described in regard to the first illustrated embodiment of the present invention.

While particular embodiments of the present invention have been shown and described, it will be obvious to those skilled in the art that changes and modifications may be made without departing from the essence of this invention; and therefore, the aim of the claims appended hereto is to cover all such changes and modifications as fall within the true spirit and scope of this invention.

The containers and trays of the present invention can be fabricated from any suitable material having suitable characteristics of strength and flexibility. Strength is, of course, necessary for a durable product. Some flexibility is desirable as it allows for better wedging action. The containers and trays can be fabricated by any of the known methods used for producing such articles, such as injection molding, blow molding, and thermo molding. The presently preferred containers are formed from moldable normally solid plastic materials. Examples of such materials include normally solid polymers of 1-olefins, e.g., polyethylene, polypropylene, and copolymers of ethylene and propylene; polystyrene; polystyrene mixed with minor amounts of natural or synthetic rubber; condensation products such as phenol-aldehyde resins; vinylchloride acetate; so-called tailored resins, examples of which are mixtures of polyethylene and polyisobutylene and mixtures of copolymers of ethylene and propylene with polyisobutylene, and the like.

Presently preferred plastic materials suitable for use in the practice of the invention are the normally solid polymers of 1-olefins having a density within the range of 0.940 to 0.980, preferably 0.950 to 0.963, grams per cubic centimeter, and a molecular weight within the range of about 35,000 to 250,000. As used herein, unless otherwise specified, the term "polymer" includes both homopolymers of said 1-olefins as well as copolymers of one of said 1-olefins with another of said 1-olefins as a comonomer. The 1-olefins having from 2 to 4 carbon atoms per molecule are usually preferred for preparing the polymer plastic materials used in the practice of the invention. However, any normally solid polymer of a 1-olefin having the properties set forth herein can be used in the practice of the invention. Methods for preparing and fabricating such normally solid polymers of said 1-olefins are well known to those skilled in the art. A preferred method for preparing said normally solid polymers of 1-olefins is that described and claimed in U.S. Pat. No. 2,825,721 issued Mar. 4, 1958, to J. P. Hogan et al. Polymers prepared in accordance with the method of said patent are available commercially under the trademark Marlex sold by Phillips Petroleum Company of Bartlesville, Oklahoma.

We claim:

1. A container and tray combination which can be secured one with the other comprising an open top container having a bottom; a tray having a bottom; a first set of a plurality of camming means spaced around a first circular locus on a lower portion of said container; and a second set of a plurality of camming means attached to the upper portion of the bottom of said tray and being spaced around a second circular locus, said first and second sets of camming means being adapted such that in at least one position of the container relative to the tray one of said sets of camming means can be telescoped within the other said set of camming means without any substantial wedging action between said sets of camming means, said first and second sets of camming means being further adapted such that upon twisting of the container relative to the tray the thus telescoped camming means slide one upon the other to cause a wedging action between said sets of camming means.

2. A container and tray combination in accordance with claim 1 wherein said first set of camming means is outside said second set of camming means when said container and said tray are secured together by said wedging action.

3. A container and tray combination according to claim 2 wherein said bottom of said container has a base portion defining a circular wall portion and wherein said first set of camming means are spaced around the inner circumference of said wall portion.

4. A container and tray combination according to claim 3 wherein said tray includes a plurality of spaced apart arcuate walls lying in a circular locus and extending upward from the upper surface of the tray bottom and said second set of a plurality of camming means are attached to the outside of said arcuate walls.

5. A container and tray combination according to claim 4 wherein said arcuate walls have a height which precludes the base portion of said container from contacting the upper surface of the bottom of said tray.

6. A container and tray combination according to claim 5 wherein said arcuate walls are three in number and are spaced about equally apart.

7. A container and tray combination according to claim 6 wherein said first set of camming means consists of three camming means and wherein said first and second sets of camming means are adapted such that the wedging action is produced only when the container is twisted in one direction relative to the tray.

8. A container and tray combination according to claim 7 wherein said second set of camming means consists of three camming means, with one of said camming means being on each of said arcuate walls.

9. A container and tray combination according to claim 8 wherein each camming means of said second set of camming means extends along substantially the total length of the arcuate wall with which it is associated.

10. A container and tray combination according to claim 2 wherein said bottom of said container has a base portion having a plurality of spaced apart arcuate walls lying in a circular locus and extending downward from the lower surface of the bottom of said container and said first set of a plurality of camming means are attached to the inside of said arcuate walls of said container.

11. A container and tray combination according to claim 10 wherein said tray includes a plurality of spaced apart arcuate walls lying in a circular locus and extending upward from the upper surface of the tray bottom and said second set of a plurality of camming means are attached to the outside of said arcuate walls of said tray.

12. A container and tray combination according to claim 11 wherein the number of the arcuate walls on the container and on the tray are the same.

13. A container and tray combination according to claim 12 wherein each arcuate wall of said container and each arcuate wall of said tray includes more than one respective camming means.

14. A container and tray combination according to claim 13 wherein there are three arcuate walls on the container and three arcuate walls on the tray and each arcuate wall includes two respective camming means.

15. A container and tray combination according to claim 14 wherein each end of each camming means is sloped such that the wedging action can be achieved by twisting the container relative to the tray in either a clockwise or a counter-clockwise direction.

16. A container and tray combination according to claim 15 wherein the arcuate walls of the trays are greater in height than the arcuate walls of the container.

17. A container and tray combination according to claim 16 wherein the arcuate walls of the tray are spaced about equally apart and wherein the arcuate walls of the container are spaced about equally apart.

* * * * *